(12) United States Patent
Jan et al.

(10) Patent No.: US 10,197,208 B2
(45) Date of Patent: Feb. 5, 2019

(54) PIPES

(71) Applicant: INEOS EUROPE AG, Rolle (CH)

(72) Inventors: Dominique Jan, Beaufays (BE); Loic Poullin, Lille (FR)

(73) Assignee: INEOS EUROPE AG, Rolle (CH)

( * ) Notice: Subject to any disclaimer, the term of this patent is extended or adjusted under 35 U.S.C. 154(b) by 448 days.

(21) Appl. No.: 14/418,854

(22) PCT Filed: Aug. 1, 2013

(86) PCT No.: PCT/EP2013/066154
§ 371 (c)(1),
(2) Date: Jan. 30, 2015

(87) PCT Pub. No.: WO2014/020096
PCT Pub. Date: Feb. 6, 2014

(65) Prior Publication Data
US 2015/0211673 A1    Jul. 30, 2015

(30) Foreign Application Priority Data

Aug. 2, 2012 (GB) .................................. 1213728.7

(51) Int. Cl.
| | |
|---|---|
| *C08F 10/00* | (2006.01) |
| *F16L 9/12* | (2006.01) |
| *F16L 57/02* | (2006.01) |
| *C08F 210/16* | (2006.01) |
| *F16L 9/127* | (2006.01) |

(52) U.S. Cl.
CPC ............ *F16L 57/02* (2013.01); *C08F 210/16* (2013.01); *F16L 9/127* (2013.01); *Y10T 428/139* (2015.01)

(58) Field of Classification Search
CPC ... C08F 210/16; C08F 210/14; Y10T 428/139
USPC ..... 428/36.9, 34.1, 35.7; 526/126, 170, 348, 526/348.5
See application file for complete search history.

(56) References Cited

U.S. PATENT DOCUMENTS

2007/0282067 A1* 12/2007 Backman ................ C08L 23/04
525/95
2011/0086191 A1* 4/2011 Chai ...................... C08F 210/16
428/36.9

FOREIGN PATENT DOCUMENTS

| EP | 1 927 626 A1 | 6/2008 |
|---|---|---|
| EP | 2 133 367 A1 | 12/2009 |
| GB | 1 476 480 A | 6/1977 |

* cited by examiner

*Primary Examiner* — Ellen S Wood
(74) *Attorney, Agent, or Firm* — Nixon & Vanderhye P.C.

(57) ABSTRACT

Pipe with an outer diameter of from 90 to 630 mm and a minimum wall thickness of higher than 3.6 mm, having (a) an extrapolated time-to-failure (ASTM F2023 and ASTM F2769-10, performed on 16 mm SDR 7.4 pipe) of at least 50 years (for classification code CL5), (b) a time to failure (ISO 1167, performed on 32 mm SDR 11 pipe) of at least 10000 hours (110° C. under hoop stress of 2.6 MPa), and (c) a resistance to slow crack growth (ISO 13479 (80° C., 9.2 bar, performed on 110 mm SDR 11 pipe)) of at least 5000 hrs. The pipe contains a copolymer of ethylene and an a-olefin, and has (a) a density (D) in the range 933-948 kg/m³, (b) a melt index ($MI_2$) in the range 0.15-2.0 g/10 min, and (c) a melt elastic modulus G' (G"=500 Pa) in the range 40 to 150 Pa.

29 Claims, No Drawings

PIPES

This application is the U.S. national phase of International Application No. PCT/EP2013/066154 filed Aug. 1, 2013 which designated the U.S. and claims priority to British Patent Application No. 1213728.7 filed Aug. 2, 2012, the entire contents of each of which are hereby incorporated by reference.

The present invention relates to pipes and in particular to large diameter pipes suitable for use in industrial applications such as desalination, offshore, industrial/waste water conveying systems, district heating and geothermal applications. The pipes comprise copolymers of ethylene and α-olefins and in particular to copolymers prepared by use of metallocene catalyst systems.

In the past polyethylene materials were cross-linked in order to achieve the desired high temperature requirements in particular long term strength for use in hot water pipe applications.

Monomodal polyethylenes such as medium density (MDPE) having densities in the range 930-942 kg/m$^3$ and high density polyethylenes (HDPE) having density in the range 945-965 kg/m$^3$ have been used for applications in the temperature range of about 0° C. to about 50° C.

High density polyethylene (HDPE) in particular is known to have a good mechanical strength at elevated temperatures and has been used in packaging applications where a good high temperature performance is required. However the long term hydrostatic strength characteristics of non crosslinked HDPE materials at higher temperatures are often unsuitable for applications such as hot water pipes.

These Polyethylenes of Raised Temperature Resistance (PE-RT) materials have been used successfully for many years in domestic and industrial hot water piping systems and also as part of underfloor heating and radiator connections. More recently the easy processing and outstanding material properties have made such materials useful in larger diameter industrial applications where standard polyethylene materials cannot be used due to high temperature limitations.

For such applications the required technical attributes of the polymers are excellent creep resistance at high temperature, good heat stability in chlorinated water environments, good processability and high flexibility.

More recently polymers having a multimodal molecular weight distribution have been used successfully for use in hot water pipe applications. Polyethylene compositions with a multimodal molecular weight distribution (MWD) for example a bimodal MWD can offer advantages compared with prior art unimodal polyethylenes. For example bimodal polyethylenes may combine the favorable mechanical properties afforded by high molecular weight polyethylene with the good processability of low molecular weight polyethylene.

Peroxide cross-linking of polymers has also been found to show some improvement in the creep resistance of the polymers at high temperature.

Prior art multimodal polyethylenes for use in pipe applications are described in WO 97/29152, WO 00/01765, WO 00/18814, WO 01/92480 and WO 01/25328. In particular EP 1425344 describes multimodal polyethylenes having a density in the range about 925 to about 950 kg/m$^3$ and melt index in the range about 0.1 to about 5 g/10 min for use in durable applications such as pipes and exhibit an excellent stress performance at higher temperatures. EP 1448702 describes pipes for hot fluids comprising multimodal polyethylenes with density in the range 921 to 950 kg/m$^3$.

WO 05/056657 describes stabilized multimodal polyethylene materials having densities >925 kg/m$^3$ which are particularly useful for pipe applications.

More recently WO 08/064810 describes pipes having improved high temperature resistance again based on polyethylene compositions having a bimodal molecular weight distribution produced in a series of reactors.

Other references teaching the use of bimodal or multimodal polyethylenes for use in pipe applications include US 2010/0092709, EP 1927626, EP 1764385, EP 1146079 and EP 1425344. None of these teach advantages such as resistance to chlorine or pressure resistance at very high temperatures (110° C./2.6 MPa).

Our earlier application WO 06/120418 describes copolymers prepared by use of metallocene catalysts having densities >930 kg/m$^3$ and melt index >4 g/10 min, suitable for use in rotomoulding applications.

Our earlier application WO 10/000557 describes metallocene derived copolymers having a high densities and low melt index suitable for use in Polyethylenes of Raised Temperature Resistance (PE-RT) applications in particular for use in hot water pipe applications and importantly may be used for both monolayer and multilayer applications.

We have now surprisingly found that pipes comprising certain metallocene derived copolymers of ethylene and α-olefins may be suitable for use in industrial applications, in particular for use in large diameter pipes. The pipes according to this aspect of the present invention exhibit an improved resistance to chlorine as well as improved resistance to slow crack growth.

Thus according to a first aspect of the present invention there is provided a pipe having an outer diameter of at least 63 mm, said pipe comprising a copolymer of ethylene and an a-olefin, said copolymer characterized in having (a) a density (D) in the range 933-948 kg/m$^3$
(b) a melt index (MI$_2$) in the range 0.15-2.0 g/10 min, and
(c) a melt elastic modulus G' (G"=500 Pa) in the range 40 to 150 Pa.

Such copolymers have been found to exhibit the balance of favorable mechanical properties afforded by high molecular weight polyethylene with the good processability of low molecular weight polyethylene previously seen with multimodal polymers. In addition, excellent long-term hydrostatic strength is obtained without any crosslinking of the polyethylene material.

The pipes of the present invention exhibit improved chlorine resistance, improved resistance to slow crack growth as well as improved pipe creep resistance.

Chlorine resistance is defined by means of the extrapolated time to failure according to ASTM F2023 and ASTM F2769-10. Resistance to slow crack growth is defined by a time to failure according to ISO 13479 and pipe creep resistance according to ISO 1167.

Thus according to a further aspect of the present invention there is provided a pipe having an outer diameter of at least 63 mm, said pipe having
(a) an extrapolated time-to-failure according to ASTM F2023 and ASTM F2769-10 (performed on 16 mm SDR 7.4 pipe) of at least 50 years (for classification code CL5),
(b) a time to failure according to ISO 1167 (performed on 32 mm SDR 11 pipe) of at least 10000 hours (at 110° C. under hoop stress of 2.6 MPa), and
(c) a resistance to slow crack growth according to ISO 13479 (80° C., 9.2 bar, performed on 110 mm SDR 11 notched pipe) of at least 5000 hrs, wherein said pipe comprises a copolymer of ethylene and an a-olefin, said copolymer characterized in having
(a) a density (D) in the range 933-948 kg/m³
(b) a melt index (MI$_2$) in the range 0.15-2.0 g/10 min, and
(c) a melt elastic modulus G' (G"=500 Pa) in the range 40 to 150 Pa.

While the present invention is directed to pipes having an outer diameter of at least 63 mm, the defined parameters of chlorine resistance, resistance to slow crack growth and pipe creep resistance are determined in accordance with the standard procedures performed on pipes having defined diameters and Standard Dimension Ratios (SDR).

For classification code CL5 according to ASTM F2023 and ASTM F2769-10, the pipe preferably has a time-to-failure of at least 60 years. For classification code CL3 according to ASTM F2023 and ASTM F2769-10, the pipe preferably has an extrapolated time-to-failure of at least 100 years, more preferably of at least 125 years.

In a preferred embodiment of the invention, the pipe made from such copolymers has superior resistance at high temperature in hydrostatic pressure testing which enable to classify it as PE-RT type II according to ISO 22391:2009. In addition, the long term hydrostatic strength of the said pipe enables it to be attributed a MRS rating of at least 8 MPa according to standard ISO 9080.

In another preferred embodiment, the pipe of the present invention preferably exhibits very good resistance to rapid propagation of cracks (RCP), reflected by a halting of crack propagation at an internal pressure equal to at least 10 bars, as measured at 0° C. on a pipe of SDR 11 with diameter 110 mm and thickness 10 mm according to method S4 described in ISO 13477:2008.

The pipe of the present invention has an outer diameter of at least 63 mm, preferably an outer diameter from 90 to 630 mm, more preferably from 110 to 315 mm. The minimum wall thickness of the said pipe are usually higher than 3.6 mm, preferably between 6.3 and 28.6 mm, and more preferably between 10 and 20 mm.

The copolymers used to the pipe also exhibit good flexibility characterised, for instance, by a tensile modulus at 23° C. and a deformation rate of 1 mm/min according to ISO 527-2 lower than 900 MPa, preferably lower than 700 MPa.

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The copolymers according to the present invention preferably have a density in the range 933-940 kg/cm³ and more preferably in the range 935-940 kg/cm³.

The copolymers according to the present invention preferably have a melt index (MI$_2$ measured under a load of 2.16 kg) in the range 0.8 to 1.5 and more preferably in the range 1.0-1.3 g/10 min.

The copolymers according to the present invention also exhibit a melt index (MI$_5$ measured under a load of 5 kg) in the range 0.5 to 6.0, preferably in the range 1.0 to 5.0 and most preferably in the range 2.0 to 4.0.

The copolymers according to the present invention preferably have a melt elastic modulus G' (G"=500 Pa) in the range 40-100 and most preferably in the range 40 to 70 Pa.

The copolymers according to the present invention preferably have a Composition Distribution Branch Index (CDBI) in the range 55-75% and preferably in the range 58-72%.

The copolymers according to the present invention may exhibit a ratio of complex dynamic shear viscosities η*(0.1)/η*(100) in the range 1.5 to 5.5 preferably in the range 2.0-5.0 and most preferably in the range 2.5-4.5.

The copolymers according to the present invention preferably have a unimodal molecular weight distribution. By unimodal molecular weight distribution is meant a copolymer that does not contain fractions of substantially different molecular weights. By substantially different molecular weights, it must be understood that, in the case of production in several reactors in series, the difference in the weight average molecular weight of the polymer, as determined by conventional gel permeation chromatography (GPC), produced in each reactor is not greater than 10%.

The copolymers of the present invention typically exhibit a molecular weight distribution (Mw/Mn) in the range 3.5 to 10 and preferably in the range 3.5 to 8.0.

The copolymers of the present invention may suitably be prepared by use of a single site catalyst system for example a metallocene catalyst system comprising, preferably a monocylcopentadienyl metallocene complex having a 'constrained geometry' configuration together with a suitable cocatalyst.

Examples of monocyclopentadienyl or substituted monocyclopentadienyl complexes suitable for use in the present invention are described in EP 416815, EP 418044, EP 420436 and EP 551277.

Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

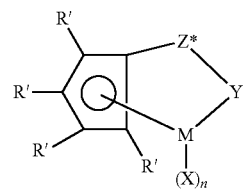

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl(tetramethyl-$\eta^5$-cyclopentadienyl) silanetitanium dichloride and (2-methoxyphenylamido)dimethyl(tetramethyl-$\eta^5$-cyclopentadienyl) silanetitanium dichloride.

Particularly preferred metallocene complexes for use in the preparation of the copolymers of the present invention may be represented by the general formula:

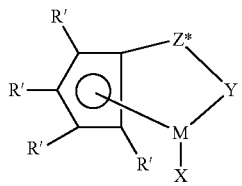

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a n-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, tetrahydrofluorenyl, or octahydrofluorenyl group.

Highly preferred Y groups are nitrogen or phosphorus containing groups containing a group corresponding to the formula —N(R'')— or —P(R'')— wherein R'' is $C_{1-10}$ hydrocarbyl.

Most preferred complexes are amidosilane—or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl)dimethyl silanetitanium-$\eta^4$-1.3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

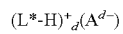

(L*-H)$^+_d$(A$^{d-}$)

wherein

L* is a neutral Lewis base (L*-H)$^+_d$ is a Bronsted acid

A$^{d-}$ is a non-coordinating compatible anion having a charge of d$^-$, and d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate, tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri(p-tolyl)(hydroxyphenyl) borate
tris(pentafluorophenyl)(hydroxyphenyl) borate
tris(pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred cocatalysts of this type are alkylammonium tris(pentafluorophenyl) 4-(hydroxyphenyl)borates. A particularly preferred cocatalyst is bis(hydrogenated tallow alkyl) methyl ammonium tris(pentafluorophenyl) (4-hydroxyphenyl)borate.

With respect to this type of cocatalyst, a preferred compound is the reaction product of an alkylammonium tris (pentaflurophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable supports are silicas having a median diameter (d50) from 20 to 70 μm, preferably from 30 to 60 μm. Particularly suitable supports of this type are Grace Davidson D948 or Sylopol 2408 silicas as well as PQ Corporation ES70 or ES757 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Suitable catalysts for use in the preparation of the novel copolymers of the present invention are suitably described in WO 04/020487 and WO 05/019275.

Particularly suitable catalysts for use in the preparation of the copolymers of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The copolymers of the present invention are preferably prepared in a single reactor.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert copolymerizing medium. Suitable diluents include toluene or alkanes such as hexane, propane or isobutane. Preferred temperatures are from about 30° C. up to about 200° C. but preferably from about 60° C. to 100° C. Loop reactors are widely used in slurry copolymerizing processes.

The novel copolymers are most suitably prepared in a gas phase process.

Gas phase processes for the copolymerizing of olefins, especially for the homopolymerisation and the copolymerization of ethylene and α-olefins for example 1-butene, 1-hexene, 4-methyl-1-pentene are well known in the art.

Typical operating conditions for the gas phase are from 20° C. to 100° C. and most preferably from 40° C. to 90° C. with pressures from subatmospheric to 100 bar.

Particularly preferred gas phase processes are those operating in a fluidized bed. Examples of such processes are described in EP 89691 and EP 699213 the latter being a particularly preferred process.

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins, suitable for use in pipes having an outer diameter of at least 63 mm, said copolymers having
(a) a density (D) in the range 933-948 kg/m$^3$
(b) a melt index (MI$_2$) in the range 0.15-2.0 g/10 min, and
(c) a melt elastic modulus G' (G"=500 Pa) in the range 40 to 150 Pa,
said method comprising copolymerizing ethylene and said alpha olefins in the presence of a catalyst system as hereinbefore described.

The novel copolymers of the present invention are most suitably used together with additive packages which operate synergistically for the environment of a pipe for use in for example chlorinated water supply. For example antioxidants and other additives may be chosen for performance with respect to the atmosphere external to the pipe and also for performance with respect to the chlorine exposure in the interior of the pipe.

A first antioxidant comprising phosphites or phosphonites such as tris(2,4-ditert-butylphenol)phosphite (Irgafos™ 168) is advantageously used in the formulation. The composition preferably contains from 0.01 to 0.3 parts of the first antioxidant per 100 parts of polymer, more preferably from 0.02 to 0.2 parts, contents from 0.05 to 0.15 parts being particularly preferred.

A second class of specific antioxidants that provides efficient protection to long term ageing particularly when exposed to water medium can also be advantageously used. For instance, low polarity hindered phenols bearing non-hydrolysable organic functions are suitable to guarantee a good dispersion of the antioxidant in the polymer matrix, but also excellent long term stability and low leaching of additive by-products in the aqueous medium. Other antioxidants with slow kinetic of hydrolysis like hydroxylamines, hindered amines light stabilizers (like derivatives of 2,2,6, 6-tetramethyl piperidine) or thiosynergists organosulfides (like distearyl thiodipropionate) can also be used. Among the different antioxidants, specific hindered phenols like 3,3',3",5,5',5"-hexa-tert-butyl α,α',α"-(mesitylene-2,4,6-trityl)tri-p-cresol (Irganox™ 1330, Ethanox™ 1330) or 1,3,5-tris(3,5-di-tert-butyl-4-hydroxybenzyl)-1,3,5-triazine-2,4,6 (1H,3H,5H)-trione (Irganox™ 3114) are preferred. Irganox™ 1330 is particularly preferred. The composition preferably contains from 0.05 to 1 part of the second antioxidant per 100 parts of polymer, more preferably from 0.1 to 0.5 part, contents from 0.15 to 0.30 part being particularly preferred.

A metal deactivator such as, for example N,N'-bis(3,5-di-t-butyl-4-hydroxyphenylpropionyl)hydrazine, N,N'-diphenyloxamide, N-salicylal-N'-salicyloyl-hydrazine, N,N'-bis(salicyloyl)hydrazine, 3-salicyloylamino-1,2,4-triazole, bis(benzylidene)oxallyl dihydrazide, oxanilide, isophthaloyl dihydrazide, sebacoyl bisphenylhydrazide, N,N'-diacetyladipoyl dihydrazide, N,N'-bis(salicyloyl)oxallyl dihydrazide, N,N'-bis(salicyloyl)thiopropionyl dihydrazide, is also advantageously used in the composition. N,N'-bis(3,5-di-t-butyl-4-hydroxyphenylpropionyl)hydrazine (Evernox™ MD 1024). The composition preferably contains from 0.01 to 0.3 parts of metal deactivator per 100 parts of polymer, more preferably from 0.02 to 0.2 parts, contents from 0.05 to 0.15 being particularly preferred.

An acid scavenger may also be advantageously used in the formulation. Metal soaps, metal oxide or hydrotalcite are known to be suitable acid scavengers. When such an acid scavenger is used, metal soaps like zinc stearate or calcium stearate or metal oxides like zinc oxide are preferred. Zinc oxide is the most preferred acid scavenger. The composition preferably contains less than 0.25 parts of the acid scavenger per 100 parts of polymer, more preferably less than 0.15 parts per 100 parts polymer and most preferably less than 0.1 parts per 100 parts polymer.

Optionally, a third antioxidant may be used in the additive package. This third antioxidant is generally a hindered phenol bearing hydrolysable organic function for example Irganox™ 1010, Irganox™ 1076, or Cyanox™ 1790. The composition preferably contains less than 0.3 part of the first antioxidant per 100 parts of polymer, more preferably less than 0.2 part, contents of less than 0.1 part being particularly preferred.

In addition processing aids, UV stabilizers, pigments or colorants may also be used in the additive package.

A typical additive package comprises 0.1 parts of the first antioxidant (Irgafos™ 168), 0.25 parts of the second antioxidant (Irganox™ 1330), 0.1 part of metal deactivator (Evernox™ MD 1024) and 0.05 parts of acid scavenger (zinc oxide) per 100 parts of the polymer composition.

Thus according to another aspect of the present invention there is provided a pipe having a diameter of at least 63 mm, said pipe comprising a copolymer of ethylene and an alpha-olefin having (a) a density (D) in the range 933-948 kg/m$^3$
(b) a melt index ($MI_2$) in the range 0.15-2/0 g/10 min, and
(c) a melt elastic modulus G' (G"=500 Pa) in the range 40 to 150 Pa and an antioxidant system comprising (a) a single hindered phenol (b) at least one phosphite, (c) at least one metal deactivator and (d) an acid scavenger.

The present invention will now be further illustrated by reference to the following examples.

EXAMPLE 1

1—Catalyst Preparation (a) Treatment of Silica with Triethylaluminium (TEA)

Under continuous agitation, 1491 L of isohexane and 397 kg of silica D948 (available from W.R. Grace), were added to a reactor. (The silica had been previously calcined under nitrogen to reach a level of hydroxyl groups of 1.53 mmol/g). 19.3 kg of an Octastat 2000 (available from Innospec) solution in pentane (2 g/l) was then added and the mixture was stirred for 15 minutes. 571 kg of a 12% triethylaluminium (TEA) solution in isohexane was then slowly added over 1 hour and the mixture was stirred for 1 hour further at 30° C. The slurry was filtered and thoroughly washed with isohexane before being transferred to a dryer. 19 kg of an Octastat 2000 solution in pentane (2 g/l) was added and the mixture was finally dried at 60° C. under vacuum. 428 kg of silica/TEA were obtained. The aluminium content of the solid was found to be 1.3 mmol/g.

(b) Preparation of Catalyst Component 1

To 216.9 kg of a 9.58% solution of $[N(H)Me(C_{18-22}H_{37-45})_2][B(C_6F_5)_3(p\text{-}OHC_6H_4)]$ (Ionic Compound A) in toluene were added over 15 minutes 17.75 kg of 11.7% TEA solution in isohexane. The mixture was further stirred for 15 minutes to yield a solution of catalyst component 1.

(c) Preparation of a Mixture of $(C_5Me_4SiMe_2N^tBu)$ $Ti(\eta^4\text{-}1,3\text{-pentadiene})$ (Complex A) with 1-hexene To 53.0 kg of a 11.6% solution of Complex A in heptane were added 47.8 kg of 1-hexene.

(d) Preparation of the Supported Catalyst 288 kg of the above prepared silica/TEA was introduced into a reactor. The above prepared solution of catalyst component 1 was fed to the reactor over 45 minutes and the mixture was then stirred for further 30 minutes. The contents of the reactor were then cooled to 15° C. and the above prepared solution of Complex A and 1-hexene was fed over a period of 30 minutes, and then the mixture was further stirred for 1 hour. During the addition the internal temperature increased to a maximum of 23° C. 34 kg of an Octastat 2000 solution in pentane (2 g/l) was then added and the mixture was dried at 45° C. until the residual solvent content in the catalyst was <1%.

Analysis of the resulting dry powder showed the titanium content to be 44.0 μmol/g, the boron content to be 53.7 μmol/g and the aluminium content to be 1.02 mmol/g.

2—Polymerisation

The copolymers according to the present invention were prepared by copolymerisation of ethylene with hexene in a gas phase fluidized bed reactor having a 5.5 m diameter and using the catalyst system prepared above.

Process conditions were as follows:

TABLE 1

| Temperature | ° C. | 85 |
| Ethylene partial pressure | bar | 12 |
| Hydrogen/ethylene ratio | mol/mol | 0.002 |
| Hexene/ethylene ratio | mol/mol | 0.0035 |
| Pentane partial pressure | bar | 3.3 |
| Production rate | ton/h | 17 |
| Space time yield | kg/h/m$^3$ | 56 |

The polyethylene powder was compounded under nitrogen atmosphere on ZSK240 extruders with the following additive package: to 99.5 parts of the polyethylene composition, 0.1 part of Irgafos™ 168, 0.25 part of Irganox™ 1330, 0.05 part of zinc oxide and 0.1 part of Evernox™ MD 1024 were added.

Polymer Properties (Example 1)

TABLE 2

| MI2 (g/10 min) | 1.17 |
| MI5 (g/10 min) | 3.1 |
| density (kg/m$^3$) | 937.2 |
| molecular weight distribution (Mw/Mn) | 4.0 |
| tensile Modulus (MPa) | 668 |
| CDBI (%) | 65.8 |
| dynamic viscosity at 100 rad/s, η * (100) (Pa · s) | 1705 |
| dynamic viscosity at 0.1 rad/s, η * (0.1) (Pa · s) | 6734 |
| ratio η * (0.1)/η * (100) | 3.95 |
| G' (G" = 500 Pa) (Pa) | 56.9 |

Determination of Polymer Properties

Density (D) of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Melt index MI$_2$ and MI$_5$ were measured using the procedures of ISO 1133 at 190° C. using loads of 2.16 and 5 kg, respectively.

Tensile Modulus was measured at 23° C. and a deformation rate of 1 mm/min on ISO 1B specimens according to ISO 527-2 standard.

Dynamic Rheological Analysis

Rheological measurements were carried out on an oscillatory rheometer (e.g., Rheometrics RDS-2, ARES) with 25 mm diameter parallel plates in a dynamic mode under an inert (nitrogen) atmosphere. For all experiments, the rheometer was thermally stable at 190° C. for at least 30 minutes before inserting the appropriately stabilised (with antioxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. under nitrogen to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain under nitrogen (as determined by the SS experiments) to check the stability of the sample during testing.

The frequency sweep (FS) experiment was then carried out at 190° C. using the above appropriately selected strain level between dynamic frequencies range of $10^{-2}$ to 100 rad/s under a nitrogen atmosphere. The complex dynamic shear viscosities, η*(100) in Pa·s, at dynamic frequency of 100 rad/s, and η*(0.1), at a dynamic frequency of 0.1 rad/s, were determined directly from the viscosity data of the frequency sweep (FS) experiment measured at 190° C.

Measurement of Melt Elastic Modulus G'(G"=500 Pa) at 190° C.

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

High Temperature Gel Permeation (Size Exclusion) Chromatography Analysis by Calibration (Classical GPC) for Apparent Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 columns WATERS STYRAGEL HMW 6E of 30 cm length and 1 guard column Waters Styragel 4.6×30 mm and a differential refractometer detector. The solvent used was 1,2,4 Trichlorobenzene at 150° C., stabilised with BHT, of 0.2 g/liter concentration.

Polymer solutions of 0.8 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |

| PS Standard | Molecular Weight |
| --- | --- |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters:

$k_{PS}=1.21\ 10\text{-}4\ dl\ g^{-1}\ \alpha_{PS}=0.707,\ k_{PE}=3.92\cdot10\text{-}4\ dl\ g^{-1},\ \alpha_{PE}=0.725.$ The calibration curve Mw Pp=f(V) was then fitted with a first order linear equation. All the calculations are done with Empower 2 software from Waters.

Determination of CDBI (as Determined by Temperature Rising Elution Fractionation (TREF).

Temperature Rising Elution Fractionation (TREF), as described for example in Wild et al., *J. Poly. Sci., Poly. Phys. Ed.*, vol. 20, p. 441 (1982), is a technique used for the analysis of the comonomer (composition) distribution in semi-crystalline polymers and more specifically for the analysis of the short chain branching distribution (SCBD) in linear low density polyethylene (LLDPE) and tacticity in polypropylene (PP).

In particular, the TREF solubility distribution curve for a copolymer can be readily used to determine a "Composition Distribution Breadth Index" ("CDBI") which has been defined (e.g., in U.S. Pat. No. 5,206,075 and PCT publication WO93/03090) as a measure of composition distribution. The solubility distribution curve is a plot of the weight fraction of the copolymer that is solubilised as a function of temperature. This is then converted to a weight fraction versus composition distribution curve, where the CDBI is determined by establishing the weight percentage of a sample that has comonomer content within 50% of the median comonomer content on each side of the median. It is also commonly assumed that all fractions have Mn≥15000 in the CDBI measurement for simplifying the correlation of composition with elution temperature.

The TREF apparatus was supplied by the PolymerChar Company with the following components:
  A special oven to perform the crystallization and elution temperature ramps. An Agilent GC 7890 oven which is split in two parts: the top oven (where the Valco valves, a vapor sensor are installed) and the main oven where the five 60 mL vessels as well as the TREF column are installed. The polymer samples are dissolved in these vessels.
  The TREF column, size: 7.8 mm (internal diameter)×15 cm (length), packed with stainless steal beads (HPLC column).
  An infrared detector.
  A dispenser (25 mL syringe).
  An Agilent Isocratic 1200 series pump.
  A 2.5 L solvent bottle (TCB).
  A 2.5 L waste bottle for the contaminated solvent.
  A computer with the software developed by PolymerChar to program analysis, for acquisition and data processing.

| Equipment | |
| --- | --- |
| Column size (mm) | 7.8 (diameter) × 150 (length) |
| Solvent | TCB |
| Packing beads | Stainless steel |
| Detector | IR |
| Wavelength (μm) | 3.42 |
| Sample preparation | |
| Concentration of the PE solution (mg/ml) | 3.2 |
| Injected volume on the column (ml) | 0.4 |
| Dissolution temperature (° C.) | 150 |
| Crystallization step | |
| Temperature range (° C.) | 95-35 |
| Crystallization rate (° C./min) | 0.5 |
| Annealed time (min) | 20 min at 35° C. |
| Elution step | |
| Elution rate (ml/min) | 0.5 (continuous) |
| Temperature range (° C.) | 35-120 |

Pipe Properties

The copolymer of example 1 was extruded in various standard pipe dimensions, and the properties of the pipes were evaluated according to the relevant standard methods.

Chlorine resistance was performed on 16 mm SDR7.4 pipes in accordance with ASTM F2023 standard allowing the time to failure to be extrapolated for different oxidation classification codes for examples CL1, CL3 and CL5. Based on the data of Table 3, the regression analysis in accordance with ASTM F2023 and ASTMF2769-10 makes it possible to calculate the regression equation (1) as well as the extrapolated time-to-failure for the different classification codes (Table 4).

TABLE 3

| Temperature (° C.) | Pressure (bar) | Hoop Stress (MPa) | Test time (h) | Status |
| --- | --- | --- | --- | --- |
| 115 | 5.5 | 2.15 | 906 | failure |
| 115 | 5.5 | 2.16 | 918 | failure |
| 115 | 4.1 | 1.63 | 726 | failure |
| 115 | 4.1 | 1.65 | 763 | failure |
| 115 | 2.8 | 1.08 | 1036 | failure |
| 115 | 2.8 | 1.07 | 1072 | failure |
| 105 | 5.5 | 2.15 | 2492 | failure |
| 105 | 5.5 | 2.13 | 2561 | failure |
| 105 | 4.1 | 1.61 | 2582 | failure |
| 105 | 4.1 | 1.61 | 2701 | failure |
| 95 | 4.1 | 1.60 | 9922 | failure |
| 95 | 4.1 | 1.59 | 10423 | failure |

Note:
all failures appear to be typical of chlorine induced brittle oxidative failure. From observations, the failures initiated on the inner pipe surface in the form of micro-cracks that propagated through the pipe wall to result in ultimate failure.

$$\text{Log(failure time)}=-163250+7502/T-115.3*\log(\text{hoop stress})/T \quad \text{Regression Equation (1)}$$

Where failure time is in hours, T in degrees Kelvin and hoop stress is in MPa

TABLE 4 extrapolated time-to-failure values at 5.5 bar for 16 × 1.8 mm pipe

| Oxidative resistance classification code | Extrapolation conditions | Extrapolated time-to-failure (in years) | Minimum requirement for F2769 (years) |
| --- | --- | --- | --- |
| CL5 | 100% at 60° C. (140° F.) | 140 | 50 |
| CL3 | 50% at 60° C. (140° F.) and 50% at 23° C. (73° F.) | 270 | 50 |

TABLE 4-continued extrapolated time-to-failure values at 5.5 bar for 16 × 1.8 mm pipe

| Oxidative resistance classification code | Extrapolation conditions | Extrapolated time-to-failure (in years) | Minimum requirement for F2769 (years) |
|---|---|---|---|
| CL1 | 25% at 60° C. (140° F.) and 75% at 23° C. (73° F.) | 540 | 50 |
| — | 100% at 82° C. (180° F.) | 5.4 | — |

Pipe Creep resistance was evaluated according to ISO 1167 on 32 mm SDR11 pipes. The pipe pressure resistance was been measured at 110° C. at a hoop stress of 2.6 MPa, and no failure was observed after about 20000 h testing. The results of the pressure testings carried out at 110° C. are summarised in Table 5 (illustration for 2.8 MPa<hoop stress<2.5 MPa, only.

TABLE 5 pipe pressure testing at 110° C.

| Test | Hoop stress (MPa) | Failure time (h) | Type |
|---|---|---|---|
| 1 | 2.77 | >6179 | Stopped |
| 2 | 2.76 | 4648 | Ductile |
| 3 | 2.76 | 4146 | Ductile |
| 4 | 2.73 | >6179 | Stopped |
| 5 | 2.71 | >7188 | Stopped |
| 6 | 2.71 | 9900 | Ductile |
| 7 | 2.70 | >6179 | Stopped |
| 8 | 2.68 | >20179 | On-going |
| 9 | 2.66 | >6179 | Stopped |
| 10 | 2.60 | >9035 | Stopped |
| 11 | 2.56 | >9035 | Stopped |
| 12 | 2.52 | >9035 | stopped |
| 13 | 2.50 | >20179 | On-going |

Resistance to slow crack growth was evaluated according to ISO 13479 standard at 80° C. and 9.2 bar on 110 mm SDR11 notched pipes. Brittle type failure was recorded after 5400 h.

Resistance to rapid crack propagation was evaluated in accordance with EN ISO 13477 standard (RCP-S4 test). Tests were performed on 110 mm SDR11 pipes having a 0.85 m length. The pipes samples were conditioned for at least 6 h in a freezer before testing. Compressed air was used as the pressure medium (13 pressure chambers). The crack length, $l_c$, was measured following the pipe axis from the centre of the striker blade. A crack length, $l_c$, higher than 4.7 times the pipe outer diameter, $d_n$, was defined as a crack propagation. Results of the tests are summarised in Table 6.

TABLE 6

| Pipe sample | Temperature (° C.) | Pressure (bar) | Result |
|---|---|---|---|
| 1 | 0 | 6 | Crack arrest |
| 2 | 0 | 10 | Crack arrest |
| 3 | −2.5 | 5 | Crack arrest |
| 4 | −5 | 5 | Crack propagation |
| 5 | −10 | 5 | Crack propagation |

No crack propagation was observed at 0° C. under a testing pressure as high as 10 bars. Hence, the critical pressure $P_{s4}$ of the polyethylene pipes of the invention is higher than or equal to 10 bars.

The critical temperature $T_c$ of the polyethylene pipes of the invention at a pressure of 5 bars is determined as −2.5° C.

In another embodiment, inventive compositions are also suitable for the manufacture of pipe articles having an MRS classification (Minimum Required Strength at 20° C. for 50 years) according to standard ISO 12162 and ISO 9080 evaluation of at least 8.0 MPa.

The invention claimed is:

1. A pipe having an outer diameter of from 90 to 630 mm and a minimum wall thickness of higher than 3.6 mm, said pipe having
    (a) an extrapolated time-to-failure according to ASTM F2023 and ASTM F2769-10 (performed on 16 mm SDR 7.4 pipe) of at least 50 years (for classification code CL5),
    (b) a time to failure according to ISO 1167 (performed on 32 mm SDR 11 pipe) of at least 10000 hours (110° C. under hoop stress of 2.6 MPa),
    (c) a resistance to slow crack growth according to ISO 13479 (80° C., 9.2 bar, performed on 110 mm SDR 11 pipe) of at least 5000 hrs, and
    (d) a MRS classification according to ISO 9080 of at least 8.0 MPa,
    said pipe comprising a copolymer of ethylene and an α-olefin, said copolymer having
    (a) a density (D) in the range 933-948 kg/m$^3$
    (b) a melt index (MI$_2$) in the range 0.15-2.0 g/10 min, and
    (c) a melt elastic modulus G' (G"=500 Pa) in the range 40 to 150 Pa.

2. A pipe according to claim 1 having an extrapolated time-to-failure according to ASTM F2023 and ASTM F2769-10 of at least 60 years (for classification code CL5).

3. A pipe according to claim 1 exhibiting a halting of crack propagation at an internal pressure equal to at least 10 bars, as measured at 0° C. on a pipe of diameter 110 mm and thickness 10 mm according to method S4 described in ISO 13477:2008.

4. A pipe according to claim 1 wherein the copolymer has a density (D) in the range 933-940 kg/cm$^3$.

5. A pipe according to claim 1 wherein the copolymer has a melt index (MI$_2$) in the range 0.8-1.5 g/10 min.

6. A pipe according to claim 1 wherein the copolymer has a melt index (MI$_5$) in the range 0.5 to 6.0.

7. A pipe according to claim 1 wherein the copolymer has a melt elastic modulus G' (G"=500 Pa) in the range 40 to 100 Pa.

8. A pipe according to claim 1 wherein the copolymers have a Composition Distribution Branch Index (CDBI) in the range 55-75%.

9. A pipe according to claim 1 wherein the copolymer has a molecular weight distribution in the range 3.5 to 10.

10. A pipe according to claim 1 wherein the copolymer has a ratio of complex dynamic shear viscosities η*(0.1)/η*(100) in the range 1.5 to 5.5.

11. A pipe according to claim 1 wherein the copolymer has a unimodal molecular weight distribution.

12. A pipe according to claim 1 wherein the copolymer is prepared by use of a single site catalyst system.

13. A pipe according to claim 12 wherein the single site catalyst system comprises a metallocene.

14. A pipe according to claim 1 wherein the α-olefin has C4 to C12 carbon atoms.

15. A pipe according to claim 14 wherein the α-olefin is 1-hexene.

16. A pipe according to claim 1 further comprising an antioxidant system comprising
    (a) a first antioxidant,
    (b) a second antioxidant,
    (c) at least one metal deactivator, and optionally
    (d) an acid scavenger.

17. A pipe according to claim 16 wherein the antioxidant system comprises
(a) 0.01-0.3 parts, (b) 0.05-1 parts and (c) 0.01-0.3 parts and (d) <0.25 parts per 100 parts of the polymer composition.

18. A pipe according to claim 16 comprising 0.1 parts of (a), 0.25 parts of (b) 0.1 part of (c) and 0.05 parts of (d).

19. A pipe according to claim 16 wherein (a) is a phosphite, (b) is a hindered phenol and (c) is a hydrazine.

20. A pipe according to claim 16 wherein the acid scavenger is zinc oxide.

21. A pipe according to claim 4 wherein the copolymer has a density (D) in the range 935-940 kg/cm$^3$.

22. A pipe according to claim 5 wherein the copolymer has a melt index ($MI_2$) in the range 1.0-1.3 g/10 min.

23. A pipe according to claim 6 wherein the copolymer has a melt index ($MI_5$) in the range 1.0 to 5.0.

24. A pipe according to claim 23 wherein the copolymer has a melt index ($MI_5$) in the range 2.0 to 4.0.

25. A pipe according to claim 7 wherein the copolymer has a melt elastic modulus G' (G"=500 Pa) in the range 40 to 70 MPa.

26. A pipe according to claim 8 wherein the copolymers have a Composition Distribution Branch Index (CDBI) in the range 58-72%.

27. A pipe according to claim 9 wherein the copolymer has a molecular weight distribution in the range 3.5 to 8.0.

28. A pipe according to claim 1 wherein the copolymer has a ratio of complex dynamic shear viscosities $\eta^*(0.1)/\eta^*(100)$ in the range 2.0-5.0.

29. A pipe according to claim 28 wherein the copolymer has a ratio of complex dynamic shear viscosities $\eta^*(0.1)/\eta^*(100)$ in the range 2.5-4.5.

* * * * *